United States Patent
Hahn et al.

(10) Patent No.: US 12,534,155 B2
(45) Date of Patent: Jan. 27, 2026

(54) MOTOR AS A SOUND GENERATING DEVICE FOR USER NOTIFICATION ON A BICYCLE

(71) Applicant: SRAM, LLC, Chicago, IL (US)

(72) Inventors: Sage Hahn, Chicago, IL (US); Kyle Hagerman, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 492 days.

(21) Appl. No.: 18/065,959

(22) Filed: Dec. 14, 2022

(65) Prior Publication Data

US 2023/0202609 A1 Jun. 29, 2023

Related U.S. Application Data

(60) Provisional application No. 63/293,487, filed on Dec. 23, 2021.

(51) Int. Cl.
*B62J 50/22* (2020.01)
*B62J 3/14* (2020.01)
*B62J 45/20* (2020.01)
*B62J 45/40* (2020.01)

(52) U.S. Cl.
CPC ............ *B62J 50/22* (2020.02); *B62J 3/14* (2020.02); *B62J 45/20* (2020.02); *B62J 45/40* (2020.02)

(58) Field of Classification Search
CPC ..... B62J 50/22; B62J 3/14; B62J 45/20; B62J 45/40; B62J 43/30; B62M 2025/006; B62M 9/128; B62M 9/122
USPC .................................................. 701/29, 29.1
See application file for complete search history.

(56) References Cited

U.S. PATENT DOCUMENTS

| 9,371,103 | B2 | 6/2016 | Fujii | |
| 2012/0004839 | A1* | 1/2012 | Mizuno | B60W 50/0097 701/123 |
| 2018/0183255 | A1* | 6/2018 | Shahana | H02J 1/14 |
| 2019/0244284 | A1* | 8/2019 | Miwa | G06Q 50/10 |
| 2020/0223513 | A1 | 7/2020 | Ho | |
| 2020/0361552 | A1* | 11/2020 | Radenbaugh | B62H 5/147 |
| 2021/0185441 | A1* | 6/2021 | Mackay | H04R 3/00 |
| 2022/0012988 | A1* | 1/2022 | Avadhanam | G08G 1/166 |
| 2023/0122447 | A1* | 4/2023 | Trehan | B60W 30/10 701/22 |

FOREIGN PATENT DOCUMENTS

| CN | 110114264 | 6/2021 |
| TW | I575847 | 3/2017 |
| TW | 202040968 | 11/2020 |
| TW | 202043083 | 12/2020 |

OTHER PUBLICATIONS

10-Amp Pro BEC Brushless ESC: JST, Webpage, https://www.horizonhobby.com/product/10-amp-pro-bec-brushless-esc-jst/EFLA1010.html, last checked Feb. 15, 2024.

* cited by examiner

*Primary Examiner* — Kira Nguyen

(57) ABSTRACT

A motorized component for a bicycle includes a motor, a power source configured to generate current for the motor, and a processor. The processor is configured to identify a state of the bicycle and, based on the identified state of the bicycle, generate an audio notification. The generation of the audio notification includes control of the current from the power source to the motor, such that a periodic current with a frequency between 20 Hz and 20 kHz is applied to the motor.

20 Claims, 10 Drawing Sheets

MOTOR AS A SOUND GENERATING DEVICE FOR USER NOTIFICATION ON A BICYCLE

This application claims priority to, and/or the benefit of, U.S. provisional patent application No. 63/293,487, filed Dec. 23, 2021, the disclosure of which is included by reference herein in its entirety.

FIELD OF THE DISCLOSURE

The present disclosure is generally directed to user notification on a bicycle and, more particularly, to the use of a motor of the bicycle for acoustic notifications.

BACKGROUND

Electronic bicycle components that are battery powered are currently limited to one or more small LEDs to provide notifications to a user about battery state, pairing status, mode configuration, such as lockout state of a suspension product, etc. The LEDs are not easily seen in bright light or when the rider is not looking at the electronic bicycle component when notification occurs.

SUMMARY

In one example, a motorized component for a bicycle includes a motor, a power source configured to generate current for the motor, and a processor. The processor is configured to identify a state of the bicycle, and generate an audio notification in response to the identified state of the bicycle. The generation of the audio notification includes control of the current from the power source to the motor, such that a periodic current with a frequency between 20 Hz and 20 kHz is applied to the motor.

In one example, the power source is a battery configured to generate DC current.

In one example, the motorized component further includes electronic circuitry electrically connected to the power source and the motor, between the power source and the motor. The processor is in communication with the electronic circuitry and is further configured to control the electronic circuitry, such that the generated DC current is converted to the periodic current with the frequency between 20 Hz and 20 kHz.

In one example, the electronic circuitry includes a switch. The processor is further configured to control the switch, such that the generated DC current is converted to pulsed DC (PDC) current, the PDC current being the periodic current.

In one example, the battery has a battery voltage. The battery voltage is applied to the motor via the electronic circuitry. The motor has a first terminal and a second terminal. The processor is further configured to control the electronic circuitry, such that the application of the voltage of the battery is switched between the first terminal and the second terminal of the battery and the periodic current is AC current with the frequency between 20 Hz and 20 kHz.

In one example, the electronic circuitry includes an H-bridge. The processor is further configured to control the H-bridge, such that the application of the voltage of the battery is switched between the first terminal and the second terminal of the battery.

In one example, the motor is configured to rotate in a first rotational direction and move a movable part of the bicycle in a first direction when the voltage of the battery is applied to the first terminal of the motor, and rotate in a second rotational direction and move the movable part of the bicycle in a second direction when the voltage of the battery is applied to the second terminal of the motor. The second rotational direction is opposite the first rotational direction.

In one example, the processor is further configured to receive data from a sensor of the bicycle, and identify the state of the bicycle based on the received data.

In one example, the sensor is a motion sensor, and the data is motion data indicating motion of the bicycle. The identification of the state of the bicycle includes identification of a voltage of the power source or another power source of the bicycle. The processor is further configured to compare the identified voltage to a predetermined threshold voltage. The generation of the audio notification in response to the identified state of the bicycle includes generation of the audio notification when, based on the comparison, the identified voltage is less than the predetermined threshold voltage.

In one example, the motorized component further includes a memory. The processor is further configured to set a flag in the memory after the generation of the audio notification. The flag prevents repetition of the generation of the audio notification.

In one example, the voltage is a first voltage. The processor is further configured to identify a second voltage of the power source or the other power source of the bicycle. The second voltage is identified after the first voltage is identified. The processor is further configured to compare the identified second voltage to the predetermined threshold voltage, and clear the flag set in the memory when, based on the comparison of the identified second voltage to the predetermined threshold voltage, the identified second voltage is greater than the predetermined threshold voltage.

In one example, the audio notification is a first audio notification, the periodic current is a first periodic current, and the frequency is a first frequency. The processor is further configured to, based on the comparison, when the identified voltage is greater than the predetermined threshold voltage, generate a second audio notification. The generation of the second audio notification includes control of the current from the power source to the motor, such that a second periodic current with a second frequency is applied to the motor, the second frequency being between 20 Hz and 20 kHz and being different than the first frequency.

In one example, the periodic current is a first periodic current, and the frequency is a first frequency. The generation of the audio notification includes control of the current from the power source to the motor, such that a second periodic current is applied to the motor after the first periodic current is applied to the motor. The second periodic current has a second frequency. The second frequency is between 20 Hz and 20 kHz and is different than the first frequency.

In one example, the motorized component further includes a memory configured to store data representing the first frequency, a first duration, the second frequency, and a second duration. The first duration is a duration of the first periodic current, and the second duration is a duration of the second periodic current. The processor is further configured to identify, based on the identified state of the bicycle, the stored data representing the first frequency, the first duration, the second frequency, and the second duration. The generation of the audio notification includes control of the current from the power source to the motor, such that the second periodic current is applied to the motor for the second duration after the first periodic current is applied to the motor for the first duration.

In one example, the periodic current is a first periodic current, the audio notification is a first audio notification, and the state of the bicycle is a first state of the bicycle. The identified first state of the bicycle is initiation of a pairing session on the bicycle. The processor is further configured to identify a second state of the bicycle. The second state of the bicycle is addition of the motorized component or another electronic device of the bicycle to the pairing session. The processor is further configured to, based on the identified second state of the bicycle, generate a second audio notification. The generation of the second audio notification includes control of the current from the power source to the motor, such that a second periodic current is applied to the motor. The second periodic current is different than the first periodic current and has a frequency between 20 Hz and 20 kHz.

In one example, the identified state of the bicycle includes Bluetooth connection, Bluetooth disconnection, or completion of a firmware update.

In one example, the power source is a battery having a battery voltage. The processor is further configured to monitor the battery voltage and compare the monitored battery voltage to a predetermined threshold battery voltage. The processor is further configured to stop the generation of the audio notification when, based on the comparison, the monitored battery voltage is less than the predetermined threshold battery voltage while the audio notification is being generated.

In one example, a rear derailleur for a bicycle includes a motor configured to move a movable part of the rear derailleur, a battery configured to generate current for the motor, and a sensor configured to measure a voltage of the battery. The rear derailleur further includes a processor in communication with the sensor. The processor is configured to compare the measured voltage to a predetermined threshold voltage, and based on the comparison, generate an audio notification using the motor when the measured voltage is less than the predetermined threshold voltage.

In one example, the generation of the audio notification includes control of the current from the battery to the motor, such that a periodic current with a frequency between 20 Hz and 20 kHz is applied to the motor and a rotational direction of the motor switches between a first rotational direction and a second rotation direction. The second rotational direction is opposite the first rotational direction.

In one example, a method for generating an audio notification using a motor of a bicycle is provided. The bicycle includes a power source configured to generate current for the motor. The method includes identifying, by a processor, a state of the bicycle, and generating, by the motor, the audio notification based on the identified state of the bicycle. Generating the audio notification includes controlling, by the processor, the current from the power source to the motor, such that a periodic current with a frequency between 20 Hz and 20 kHz is applied to the motor.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

An acoustic interface, such as beep sequences, is an effective way for an electronic bicycle component to provide information to a rider without the rider having to look directly at the electronic bicycle component when a notification occurs. It is, however, cost and size prohibitive to include a speaker or buzzer in an electronic bicycle component such as, for example, a rear derailleur.

An electric motor may generate acoustic noise when powered by an alternating or periodic current. The periodic current creates a periodic torque and various periodic internal motor forces at a frequency of the periodic current. The periodic torque and the periodic internal motor forces generate mechanical acceleration of the electric motor, which generates sound at the frequency of the periodic current and other harmonic frequencies.

The present disclosure provides examples of control of an electric motor of a bicycle to generate an acoustic notification at the bicycle. The electric motor is controlled with a periodic current that turns on and off at a rate that is in the range of human hearing (e.g., between approximately 20 Hz and approximately 20 kHz). When the electric motor is controlled for movement of a component of the bicycle (e.g., for a gear shift by a rear derailleur), a periodic current may be used to regulate a speed and a torque of the motor; a frequency of this periodic current, however, is greater than 20 kHz, so as to be above the range of human hearing.

If the electric motor is being used for acoustic notification, it may not be desirable for the component that is movable by the electric motor to actuate as a result of the acoustic notification. Accordingly, an alternating current may be applied to the electric motor, such that the electric motor changes directions rapidly and the component is not effectively advanced.

The disclosed control of an electric motor already included on a bicycle avoids the cost and space for a dedicated speaker or buzzer for providing an acoustic notification. The acoustic notification generated by the already included electric motor may notify a user (e.g., the rider) of various scenarios such as, for example, battery state, pairing status, and mode configuration during bright light conditions and without the user having to look directly at a component when a notification occurs.

Figure 1:
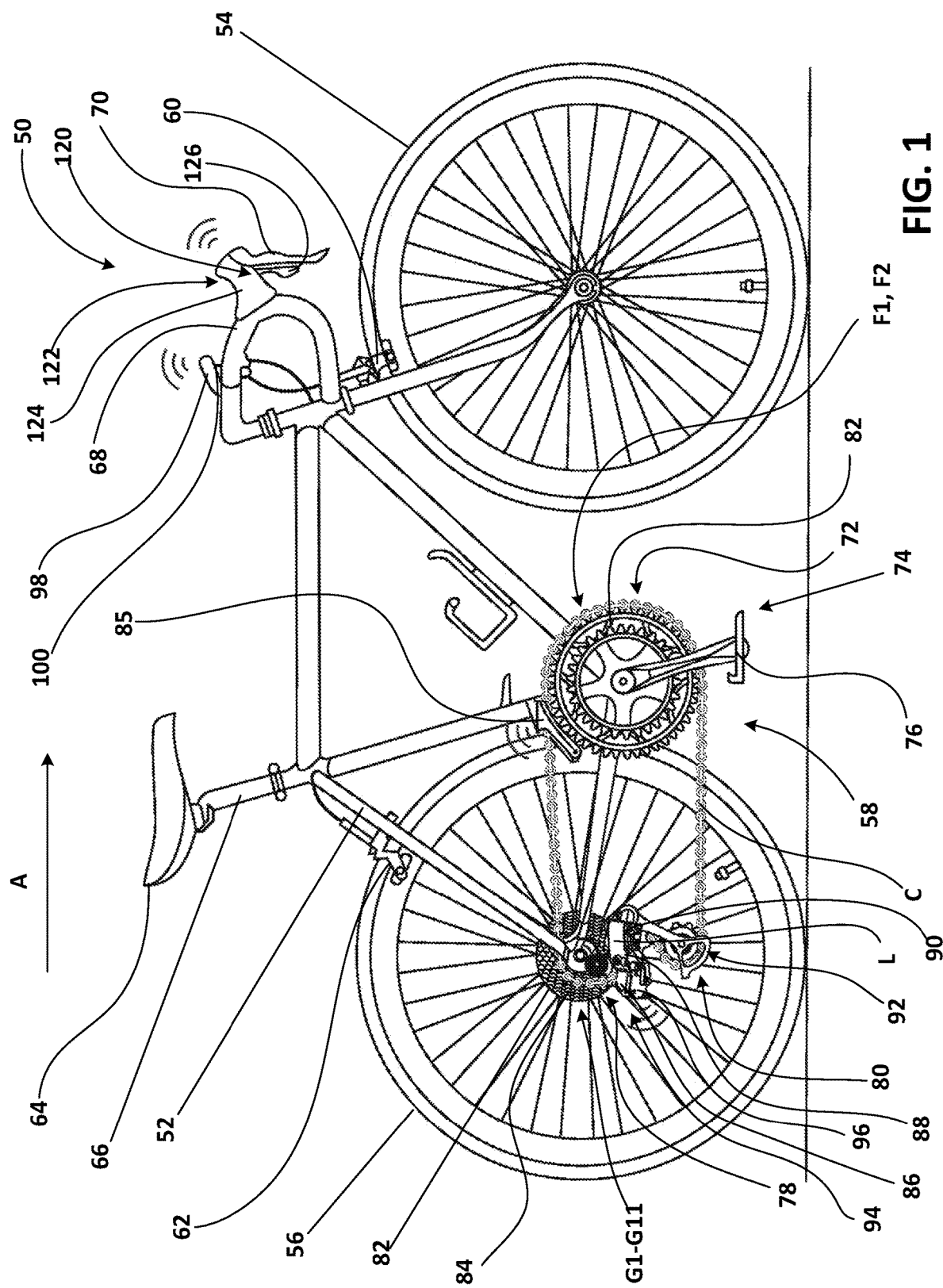
FIG. 1 shows a side view of one example of a bicycle with motor control for audio notification in accordance with the teachings of this disclosure.
Figure 2:
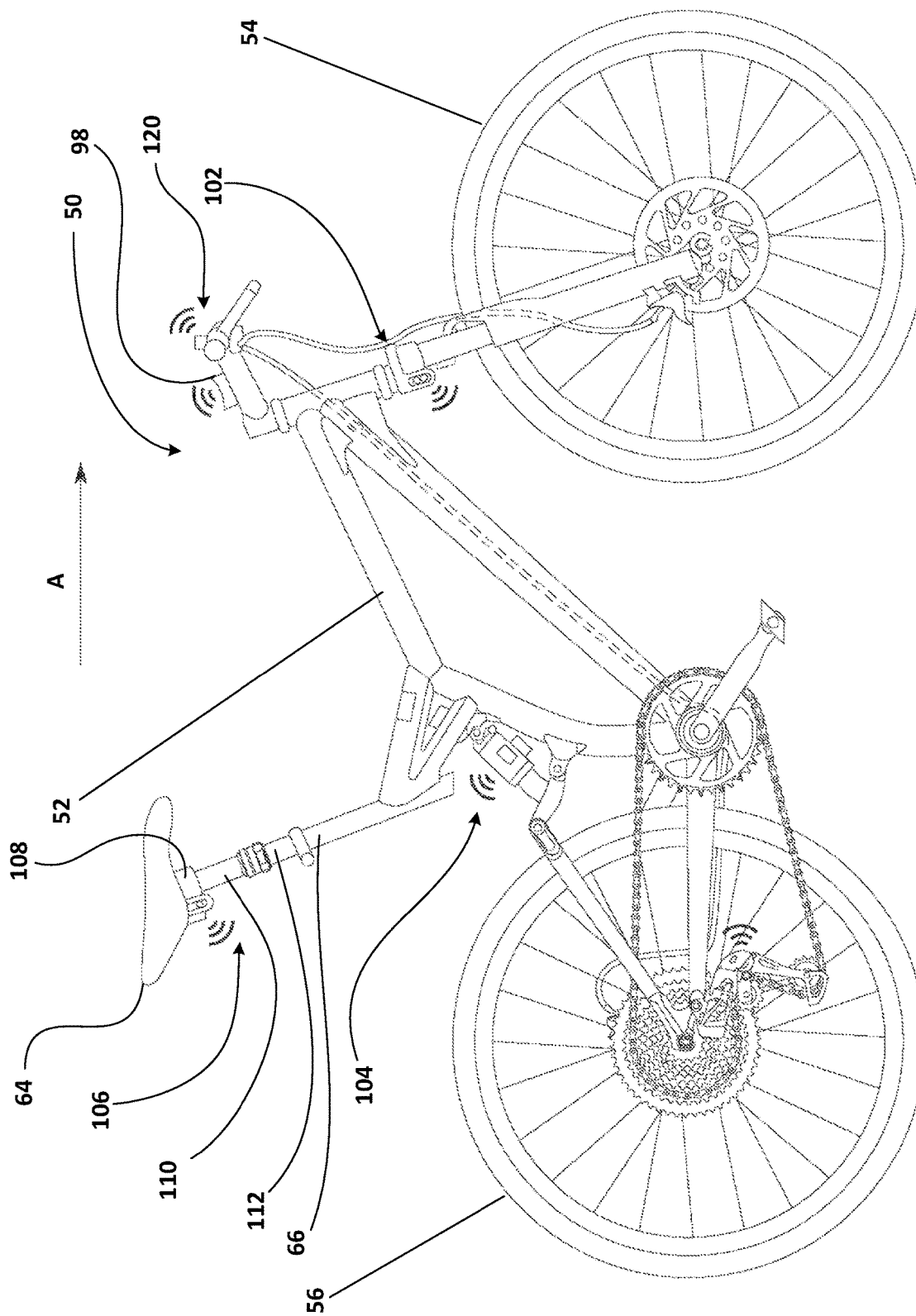
FIG. 2 shows a side view of another example of a bicycle with motor control for audio notification in accordance with the teachings of this disclosure.

Turning now to the drawings, FIGS. 1 and 2 illustrate respective examples of human powered vehicles 50 for which the disclosed motor motion control for the generation of an audio notification may be implemented with a wireless control system or a wired control system. In FIG. 1, the human powered vehicle 50 is a first type of bicycle, such as a road bicycle. In FIG. 2, the human powered vehicle 50 is a second type of bicycle, such as a mountain bicycle. While the bicycles 50 depicted in FIGS. 1 and 2 are a road bicycle (e.g., with mechanical (cable, hydraulic, and/or pneumatic) or non-mechanical (wired and/or wireless) drive systems) and a mountain bicycle (e.g., with full or partial suspensions), respectively, the component motion control, including the specific embodiments and examples disclosed herein, as well as alternative embodiments and examples, may be implemented on other types of vehicles or bicycles. For example, the disclosed component motion control may be used on other types of two-, three-, and four-wheeled human powered vehicles as well.

Referring to FIG. 1, a bicycle 50 employs a control device and a method for controlling one or more components of the bicycle 50 (e.g., motors and/or electronic circuitry) in accordance with the teachings of the present disclosure. The bicycle 50 includes a frame 52, a front wheel 54 and a rear wheel 56 each rotatably attached to the frame 52, and a drivetrain 58. A front brake 60 is provided for braking the front wheel 54, and a rear brake 62 is provided for braking the rear wheel 56. The bicycle 50 also generally has a seat 64 near a rear end of the frame 52 and carried on an end of a seat tube 66 connected to the frame 52. The bicycle 50 also has handlebars 68 near a forward end of the frame 52. The handlebars 68 are attached to the frame 52 for user, or rider, control of the bicycle 50. A brake lever 70 is carried on the handlebars 68 for actuating the front brake 60, the rear brake 62, or both the front brake 60 and the rear brake 62. If the brake lever 70 actuates only the front brake 60 or the rear brake 62, a second brake lever (not shown) may also be provided to actuate the other brake. A front and/or forward riding direction or orientation of the bicycle 50 is indicated by the direction of the arrow A in FIG. 1. As such, a forward direction for the bicycle 50 is indicated by the direction of arrow A.

The drivetrain 58 has a chain C and a front sprocket assembly 72, which is coaxially mounted with a crank assembly 74 having pedals 76. The drivetrain 58 also includes a rear sprocket assembly 78 coaxially mounted with the rear wheel 56 and a rear gear changer, such as a rear derailleur 80.

As is illustrated in FIG. 1, the front sprocket assembly 72 may include one or more coaxially mounted chain rings, gears, or sprockets. In the example of FIG. 1, the front sprocket assembly 72 has two such sprockets, F1 and F2, each having teeth 82 around a respective circumference. In the example of FIG. 2, the front sprocket assembly 72 has one such sprocket F1, having teeth 82 around a circumference of the sprocket F1. As shown in FIGS. 1 and 2, the rear sprocket assembly 78 may include a plurality (e.g., eleven and nine in FIGS. 1 and 2, respectively) of coaxially mounted gears, cogs, or sprockets G1-GN. Each sprocket G1-GN also has teeth 84 arranged around a respective circumference. Referring to FIG. 1, the number of teeth 82 on the smaller diameter front sprocket F2 may be less than the number of teeth 82 on the larger diameter front sprocket F1. The number of teeth 84 on the rear sprockets G1-GN may gradually decrease from the largest diameter rear sprocket G1 to the smallest diameter sprocket GN. As shown in FIG. 1, a front gear changer 85 may be operated to move from a first operating position to a second operating position to move the chain C between the front sprockets F1 and F2. Likewise, the rear derailleur 80 may be operable to move between a number of different operating positions (e.g., nine or eleven operation positions) to switch the chain C to a selected one of the rear sprockets G1-GN. In an embodiment, the rear sprocket assembly 78 may have more or fewer sprockets. For example, in an embodiment, a rear sprocket assembly may have twelve or thirteen sprockets. Dimensions and configuration of the rear derailleur 80 may be modified to accommodate a specific implemented plurality of sprockets. For example, an angle and length of a linkage and/or a configuration of a cage of the rear derailleur 80 may be modified to accommodate specific sprocket combinations.

The rear derailleur 80 is depicted in these examples as a wireless, electrically actuated rear derailleur mounted or mountable to the frame 52, or frame attachment, of the bicycle 50. The electric rear derailleur 80 has a base member 86 (e.g., a b-knuckle) that is mounted to the bicycle frame 52. A linkage 88 has two links L that are pivotally connected to the base member 86 at a base member linkage connection portion. A movable member 90 (e.g., a p-knuckle) is connected to the linkage 88. A chain guide assembly 92 (e.g., a cage) is configured to engage and maintain tension in the chain and is pivotally connected to a part of the movable member 90. The cage 92 may rotate or pivot about a cage rotation axis in a damping direction and a chain tensioning direction.

A motor module 94 is carried on the electric rear derailleur 80 and has a battery 96. The battery 96 supplies power to the motor module 94. In one example, the motor module 94 is located in the movable member 90. However, the motor module 94 may instead be located elsewhere, such as in one of the links L of the linkage 88 or in the base member 86. The motor module 94 may include a gear mechanism or transmission. As is known in the art, the motor module 94 and gear mechanism may be coupled with the linkage 88 to laterally move the cage 92 and thus switch the chain C among the rear sprockets on the rear sprocket assembly 78.

The battery 96 may instead be an alternate power supply or power source and may operate other electric components of the bicycle 50 within a linked system. In one example, the battery 96 alone powers all electric components of the bicycle 50 (e.g., a drive motor for an electrically powered bicycle), including the rear derailleur 80. In other examples, multiple power supplies, which may collectively or individually power the electric components of the system, including the rear derailleur 80, may be provided. Additional batteries or other power supplies may be attached to the rear derailleur 80 or located at other positions, such as the frame 52. In this example, however, the battery 96 is configured to be attached directly to the rear derailleur 80, and to provide power to the components of the rear derailleur 80. In an embodiment, the rear derailleur is configured such that the battery 96 provides power to only the components of the rear derailleur 80.

As shown in the examples of FIGS. 1 and 2, a control device 98 is mounted to the handlebars 68 for wirelessly actuating the motor module 94 and operating the rear derailleur 80 for executing gear changes and gear selection. As shown in the example of FIG. 1, the control device 98 is mounted to the handlebars 68 with a control device coupler 100. Multiple control devices 98 may be used with the bicycle 50. The control device 98 is configured to actuate or otherwise control components of the bicycle 50. For example, the control device 98 may be configured to control gear shifting of the front gear changer 85 and/or the rear derailleur 80.

Referring to FIG. 2, the control device 98 may also be configured to control characteristics of a suspension system (e.g., front suspension 102 and/or rear suspension 104). The front suspension 102 movably mounts the front wheel 54 to the frame 52, and the rear suspension 104 movably mounts the rear wheel 56 to the frame 52. The front suspension 102 and the rear suspension 104 may include one or more adjustable suspension components such as, for example, a spring or damper. The control device may be configured to adjust the one or more adjustable suspension components. In one example, the control device 98 is configured to control a motor within the front suspension 102 or the rear suspension 104 to adjust a spring or damper of the front suspension 102 or the rear suspension 104.

The control device 98 may also be configured to control characteristics of a seat post assembly 106. The seat post assembly 106 movably attaches the seat 64 to the frame 52. The seat post assembly 106 may include a seat post head 108 attachable to the seat 64 (e.g., a saddle) and connected to a seat post upper tube 110. The seat post upper tube 110, the seat post head 108, and the saddle 64 may be configured to move relative to a seat post lower tube 112 fixably attached to the frame 52. For example, the seat post upper tube 110 may ride within the seat post lower tube 112, where the seat post lower tube 112 is fixed to the seat tube 66 of the frame 52. In one example, the control device 98 is configured to control a motor within the seat post assembly 106 to adjust a height of the seat 64 relative to the frame 52.

In other embodiments, the control device 98 may be located in other locations on the bicycle 50 or, alternatively, may be distributed among various components of the bicycle 50, with routing of a communication link to accommodate necessary signal and power paths. The control device 98 may also be located in places other than on the bicycle 50, such as, for example, on a rider's wrist or in a jersey pocket. The communication link may include wires, may be wireless, or may be a combination thereof. In one example, the control device 98 may be integrated with the rear derailleur 80 to communicate control commands between components. The control device 98 may include a processor, a communication device (e.g., a wireless communication device), a memory, and one or more communication interfaces.

The handlebars 68 of FIG. 1 illustrates a drop bar assembly, and FIG. 2 illustrates an aero-bar configuration; however, the control device 98 may be used with other types of handlebar assemblies as well, such as bullhorn bars, riser bars, or any other type of bicycle handlebar. Also, while the embodiments described herein describe control devices attached to handlebars, a person having experience in the art would recognize the possible positioning of control devices 98 at other areas of the bicycle 50, such as locations throughout the frame 52.

Each of FIGS. 1 and 2 depicts an embodiment of a wireless control system that includes a control assembly 120 for controlling components of the bicycle 50. The control assembly 120 may be a plurality of control assemblies. For example, a pair of control assemblies 120 may be used. The embodiments shown may be employed on various configurations of the bicycle 50. For example, the control assembly 120 of FIG. 1 may be employed on the handlebars 68. The control assembly 120 may also be mounted elsewhere on the bicycle 50. For example, an embodiment of the control assembly 120 may be mounted to a stem, where the stem is configured to attach the handlebars 68 to the frame 52.

Referring to FIG. 1, for the bicycle 50 embodied as a road bike, the control assembly 120 has a hood portion 122 mounted to a handlebar 68 with an attachment member connected to a first end of the hood portion 122. The attachment member may be a clamp or may be otherwise attachable, for example, through threaded engagement with the handlebar 68. The hood portion 122 includes a second end attached to the brake lever 70. The hood portion 122 is configured to support rider hand placement forward of the handlebar 68 between the first end and the second end of the hood portion 122. The hood portion 122 may have a hood cover 124 configured to facilitate gripping of the hood portion 122 by the rider. The control assembly 120 is shown to further include a switch device 126. The switch device 126 may be a button, lever, or other implement controllable by a rider. The switch device 126 may be a plurality of controls. For example, two of the switch devices 126 may be used on one of the control assemblies 120.

Referring to FIG. 2, for the bicycle 50 embodied as a mountain bike, one or more switch devices are located on the handlebars 68 (not shown). The control device 98 may be configured to communicate electronically with at least one of the one or more switch devices 126. The control device 98 is shown connected to the handlebars 68, but the control device 98 may be connected to other components of the bicycle 50, such as the stem or the frame 52. Alternatively, the control device 98 may be removed from the bicycle 50 (e.g., as a worn or carried device).

Circuitry of the control assembly 120 configured to transmit and/or receive signals may be integrated with the switch device 126, and/or may be remotely located, such as in the control device 98. The control device 98 may be employed to consolidate components of a plurality of the control assemblies 120. For example, the control device 98 may have circuitry that includes transmission and/or reception components that may be included on and/or in the control assembly 120 in other embodiments. The control device 98 may also include a control user interface. The control user interface may be a display and may be configured to represent a status of components and/or may include an interface to control or adjust components. For example, the control user interface may be a touch screen. Alternatively or additionally, the control device may include one or more user device buttons to control or adjust components. In one embodiment, the bicycle 50 includes a plurality of control user interfaces (e.g., at the control device 98 and at the switch device 126). In one embodiment, the bicycle 50 includes a plurality of control devices 98 located at different locations on the bicycle 50. For example, a first control device of the plurality of control devices 98 includes the circuitry of the control assembly 120 and is attached to the frame 52 at a distance from the handlebars 68 of the bicycle 50, and a second control device of the plurality of control devices 98 includes the control user interface and is attached to the handlebars 68, so that the user may interact with the one or more device buttons to control or adjust the components. The first control device and the second control device are in communication with each other (e.g., wirelessly or via wired connection).

In one embodiment, the control assembly 120 may be attached to the handlebar 68 independently of the brake lever 70. Each embodiment of the control assembly 120 is shown to have a single embodiment of the switch device 126. However, another embodiment of the wireless control system may include more than one of the switch devices 126 on one or more of the control assemblies 120. For example, one of the control assemblies 120 may include two of the switch devices 126 arranged in opposition as on a rocker switch, and the other of the control assembly 120 may include a single embodiment of the switch device 126.

The control assembly 120 may include wireless communication components to control other components of the bicycle 50. For example, the control assembly 120 may include a control communication device configured to transmit operation signals responsive to actuation of the switch device 126. The control communication device may be further configured to send signals responsive to actuation of the switch device 126. The control communication device may be configured to send different signals responsive to different positions of the switch device 126.

Other components of the bicycle 50 may be configured to respond to various signal types. For example, components may be configured to respond differently to first signals and second signals transmitted by the control communication device. In an embodiment, a component such as the rear derailleur 80 and/or the front gear changer 85 is configured to perform a first action responsive to transmission of the first signal and to perform a second action responsive to transmission of the second signal. In another embodiment, the control communication device is configured to enter the ready mode responsive to the first signal and transmit an operation signal responsive to the second signal.

Figure 3:
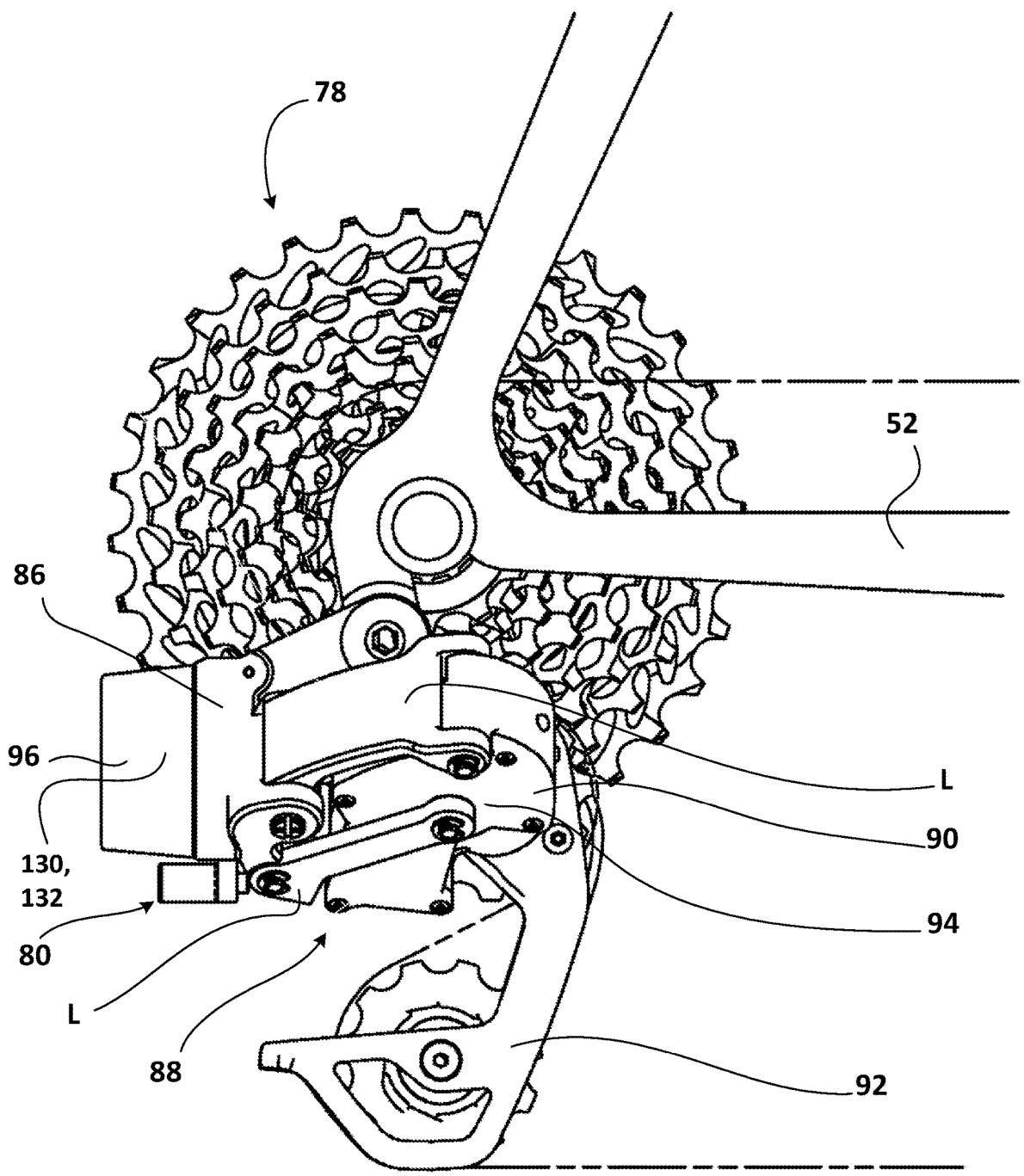
FIG. 3 is a side view of one example of a rear gear changer attached to a bicycle.

Referring to FIG. 3, various embodiments may include the rear derailleur 80, which is used to control movement of the chain C between rear sprockets G1-GN of the rear sprocket assembly 78. The rear derailleur 80 depicted in FIG. 3 includes the battery 96. The battery 96 may be rechargeable. The battery 96 is shown attached to the base member 86 of the rear derailleur 80, but may be located on another part or parts of the rear derailleur 80 or on the frame 52. The base member 86 attaches to the frame 52 and is connected to the movable member 90 of the rear derailleur 80 by the linkage 88 of the rear derailleur 80. The movable member 90 is configured to move relative to the base member 86 responsive to a force as may be supplied by a rear motor.

A motor of the motor module 94 (e.g., the rear motor) may be controlled by a rear processor to execute shifts up or down the rear sprocket assembly 78. The rear processor may be responsive to signals generated by the control assembly 120. For example, the control communication device of the control assembly 120 may wirelessly communicate with a rear communication device associated with the rear processor. The rear communication device may be a radio or any other device configured to communicate with the control communication device. In an embodiment, communication between the rear communication device and the control communication device may be wireless.

The rear motor of the motor module 94 may be any number of different types of motors. For example, the rear motor may be a brushed cored DC motor, a brushed coreless DC motor, an inrunner brushless DC motor, an outrunner brushless DC motor, or another type of motor.

The motor module 94 may include circuitry to control an input voltage to the rear motor. For example, the motor module 94 may include one or more switches. In one embodiment, the motor module 94 includes an H-bridge electrically connected between the battery 96 and the rear motor. The H-bridge is controlled to alternate the terminal (e.g., terminal 1 or terminal 2) of the rear motor to which an output voltage of the battery 96 is applied. Switches of the H-bridge may be controlled by, for example, the rear processor. The rear processor, for example, may control a frequency at which switches of the H-bridge open and close, respectively. In other embodiments, the circuitry to control an input voltage to a motor (e.g., the rear motor) may be located elsewhere on the bicycle 50.

In one embodiment, in response to an identified status of the bicycle 50 (e.g., a new pairing or movement of the bicycle 50 from a rest position), the rear processor may open and close pairs of switches of the H-bridge, such that alternating periodic voltages are applied to the terminals of the rear motor, respectively. In another embodiment, in response to the identified status of the bicycle 50, the rear processor, for example, opens and closes a switch, such that a periodic voltage is applied to one of the terminals of the rear motor. The rear processor, for example, may open and close any number of switches of the motor module 94 at any number of frequencies (e.g., a frequency in the range of human hearing; between 20 Hz and 20 kHz). Other circuitry may be provided to control the input voltage to the rear motor.

The rear derailleur 80 may include one or more sensors 130 configured to identify (e.g., measure) parameters of the rear derailleur 80 and/or the bicycle 50. For example, the one or more sensors 130 of the rear derailleur 80 may include one or more temperature sensors configured to measure one or more temperatures corresponding to, for example, the battery 96 of the rear derailleur 80. The one or more temperature sensors 130 may be located within the battery 96, on the battery 96, and/or within or on another component of the rear derailleur 80. The one or more temperature sensors 130 may include any number of different kinds of temperature sensors including, for example, a semiconductor-based sensor, a thermocouple, and/or another type of temperature sensor.

The rear derailleur 80 may include other types of sensors instead of or in addition to the temperature sensors. For example, the rear derailleur 80 may include one or more voltage sensors 132 configured to identify (e.g., measure) a voltage of the battery 96 and/or one or more current sensors configured to identify (e.g., measure) an input current and/or an output current of the battery 96. The one or more voltage sensors 132 and/or the one or more current sensors may be located within and/or outside of the battery 96, respectively. The one or more sensors of the rear derailleur 80 are in communication with the control processor via the rear processor, which may transmit measured temperatures, voltages, and/or currents to the control processor via, for example, the rear communication device and the control communication device.

The bicycle 50 may include additional, fewer, and/or different sensors. For example, a battery of the seat post assembly 106 may include one or more temperature sensors, one or more voltage sensors, and/or one or more current sensors. As another example, one or more batteries of the suspension system may include one or more temperature sensors, one or more voltage sensors, and/or one or more current sensors. Other sensors may be provided. As yet another example, the one or more sensors 130 of the rear derailleur 80 may include one or more motion sensors. The one or more motion sensors 130 may include, for example, one or more accelerometers configured to identify when the bicycle 50 is moving. In one embodiment, at least one of the one or more accelerometers is not located on or in the rear derailleur (e.g., is located on part of the frame 52 of the bicycle 50).

Figure 4:
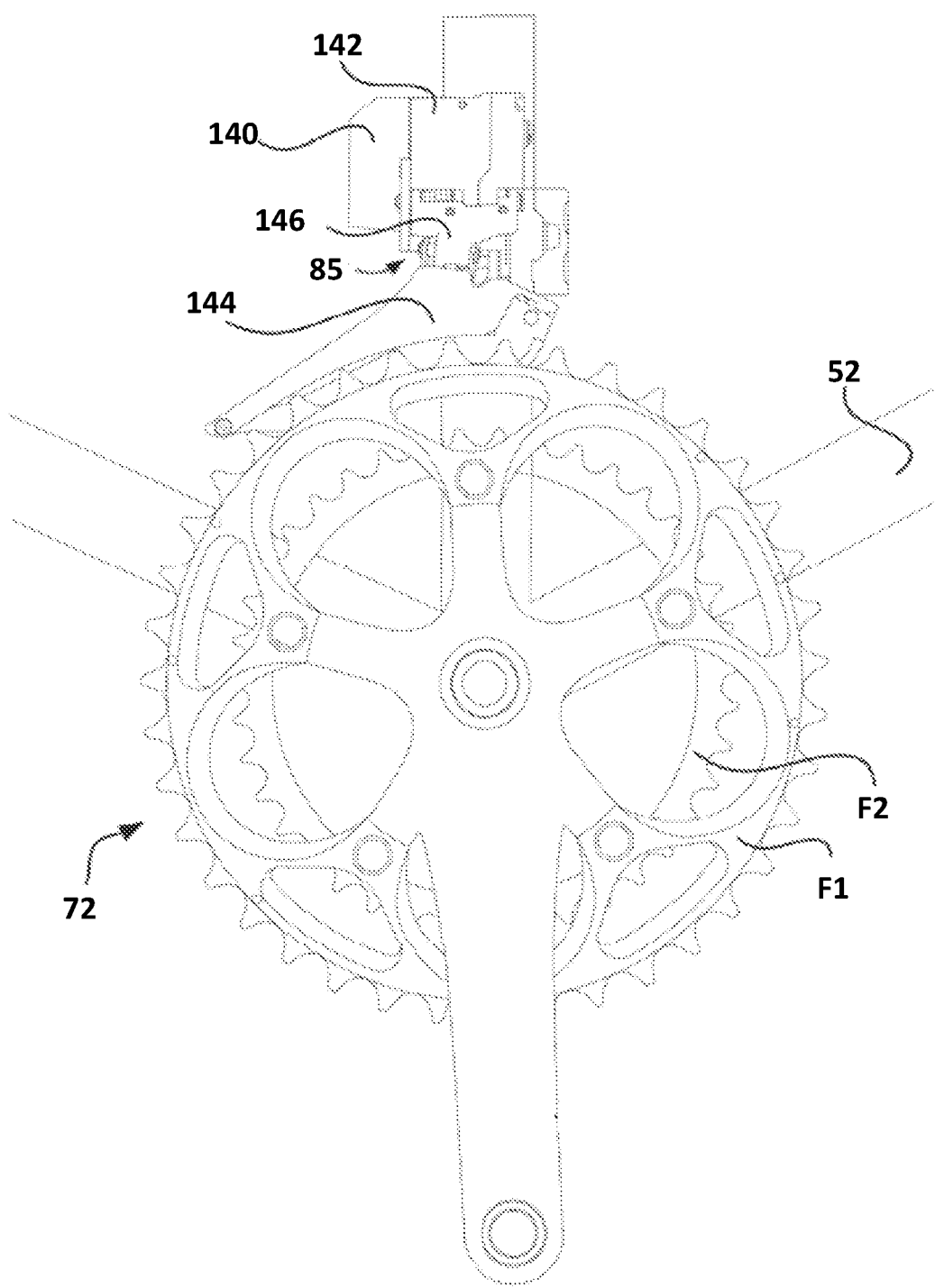
FIG. 4 is a side view of one example of a front gear changer attached to a bicycle.

Referring now to FIGS. 1 and 4, various embodiments of the bicycle 50 may include the front gear changer 85 shown to control movement of the chain C between the front sprockets F1, F2 of the front sprocket assembly 72. The front gear changer 85 includes a front power source 140 (e.g., a battery). Alternatively, the front gear changer 85 may use a common power source. For example, the front gear changer 85 and the rear derailleur 80 may have a wired connection therebetween such that both the rear derailleur 80 and the front gear changer 85 draw power from the battery 96, the front power source 140, or a central power source (not shown).

In one embodiment, the front power source 140 includes one or more temperature sensors configured to identify (e.g., measure) one or more temperatures of the front power source 140, respectively, one or more voltage sensors configured to identify (e.g., measure) one or more voltages of the front power source 140, respectively, and/or one or more current sensors configured to identify (e.g., measure) one or more currents of the front power source 140, respectively.

The front gear changer 85 includes a front base member 142 connected to the frame 52 and a front movable member 144 movably connected to the front base member 142 by a front linkage 146. The front power source 140 may supply power to a front motor. The front motor is configured to apply torque to components of the front gear changer 85 in order to move the front movable member 144 relative to the front base member 142. In such a way, the front gear changer 85 may shift the chain C between the front sprockets F1, F2 of the front sprocket assembly 72.

The front sprocket assembly 72 shown includes the larger diameter front sprocket F1 and the smaller diameter front sprocket F2. A different number of sprockets F may be employed. For example, three sprockets F1, F2, F3 may be employed. Alternatively, a single front sprocket F1 may be employed, in which case the front gear changer 85 may be omitted, as shown in FIG. 2.

A front processor may be included to control the front motor in order to execute shifts up or down the front sprocket assembly 72. The front processor may be responsive to the control assembly 120. For example, the control communication device of the control assembly 120 may wirelessly communicate with a front communication device associated with the front processor. The front communication device may also be configured to wirelessly communicate with the rear communication device associated with the rear processor. For example, the rear communication device may send signals received by the front communication device. In this example, the front communication device may increase listening activity responsive to receiving signals from the rear communication device. The front communication device may be a radio or any other device configured to communicate with the control communication device of the control assembly 120.

Referring to FIG. 1 and the discussion of the switch device 126 above, the switch device 126 may include a control compartment configured to house a control unit. The control compartment may be sealed from environmental factors to protect components of the control unit. In an embodiment, the control compartment is constructed substantially from radio frequency transparent materials.

The control unit may include the control communication device and the control processor. The control unit may include a printed circuit board ("PCB") having circuitry for interpreting actions, generating signals, and/or transmitting signals. Alternatively, the control unit may be omitted, and components associated therewith may be otherwise connected. For example, flexible connectors such as wires may be used.

The control unit may be in a PCB configuration. The PCB embodiment of the control unit has a substrate to which components of the control unit are applied and/or attached. The substrate may form a structure and/or shape of the control unit. The substrate may be any substance operable to form an underlying attachment of the components of the control unit, such as a dielectric composite material. For example, composites such as phenolic cotton paper (e.g., FR-2), cotton paper and epoxy (e.g., FR-3), glass-reinforced epoxy (e.g., FR-4, FR-5, FR-6), and/or other materials as well as combinations thereof, may be used. The substrate may be rigid or flexible.

Connection of circuitry to the control unit may be accomplished using various techniques. In an embodiment, connection is accomplished through application of a layer of an electrically conductive medium, such as solder, between electrical contact connection surfaces of the control unit. Such a connection may provide an electrically communicative contact between electronic components connected to the control unit, such as the control communication device and the control processor of the switch device 126. In one embodiment, at least some components of the switch device 126 (e.g., components of the control unit of the switch device 126) are included within the control device 98, and the switch device 126 and the control device communicate via one or more wired and/or wireless connections.

The control unit includes the control processor and a control memory. The control processor may include a general processor, a digital signal processor, an application specific integrated circuit ("ASIC"), a field programmable gate array ("FPGA"), an analog circuit, a digital circuit, combinations thereof, or other now known or later developed processor. The control processor may be a single device or a combination of devices, such as through shared or parallel processing.

The control memory may be a volatile memory or a non-volatile memory. The control memory may include one or more of a read only memory ("ROM"), a random access memory ("RAM"), a flash memory, an electronic erasable program read only memory ("EEPROM"), or another type of memory. The control memory may be removable from the control unit, such as in a secure digital ("SD") memory card. In a particular non-limiting, exemplary embodiment, a computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device. Accordingly, the disclosure is considered to include any one or more of a computer-readable medium and other equivalents and successor media, in which data or instructions may be stored.

The control memory is a non-transitory computer-readable medium and is described to be a single medium. However, the term "computer-readable medium" includes a single medium or multiple media, such as a centralized or distributed memory structure, and/or associated caches that are operable to store one or more sets of instructions and other data. The term "computer-readable medium" shall also include any medium that is capable of storing, encoding, or carrying a set of instructions for execution by a processor or that cause a computer system to perform any one or more of the methods or operations disclosed herein.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

The control unit is operable to interpret a signal indicative of a shift command generated in response to operation of the switch device 126. In accordance with various embodiments of the present disclosure, methods described herein may be implemented with software programs executable by a computer system, such as the control device 98, the control unit of the switch device 126, the rear derailleur 80, the front gear changer 85, and/or other components on the bicycle 50 and/or worn by the user. Further, in an exemplary, non-limited embodiment, implementations may include distributed processing, component/object distributed processing, and parallel processing. Alternatively, virtual computer system processing can be constructed to implement one or more of the methods or functionality as described herein.

A computer program (also known as a program, software, software application, script, or code) may be written in any form of programming language, including compiled or interpreted languages, and the computer program may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and the apparatus may also be implemented as, special purpose logic circuitry (e.g., an FPGA or an ASIC).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware, as well as other electronic components. The term "circuitry" would also cover, for example and if applicable to the particular claim element, a baseband integrated circuit or applications processor integrated circuit for a mobile computing device or a similar integrated circuit in server, a cellular network device, or other network device.

Processors suitable for the execution of a computer program include, by way of example, both general and special purpose microprocessors, and any one or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or is operatively coupled to receive data from or transfer data to, or both, one or more mass storage devices for storing data (e.g., magnetic, magneto optical disks, or optical disks). However, a computer need not have such devices. Moreover, a computer may be embedded in another device such as, for example, a mobile telephone, a personal digital assistant ("PDA"), a mobile audio player, a Global Positioning System ("GPS") receiver, a control unit, a rear derailleur, or a front gear changer, to name just a few. Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD-ROM and DVD-ROM disks. The processor and the memory may be supplemented by, or incorporated in, special purpose logic circuitry.

The control communication device provides for data and/or signal communication from the control unit to another component of the bicycle, or an external device such as a mobile phone or other computing device. The control communication device communicates the data using any operable connection. An operable connection may be one in which signals, physical communications, and/or logical communications may be sent and/or received. An operable connection may include a physical interface, an electrical interface, and/or a data interface. The control communication device may be configured to communicate wirelessly, and as such include one or more antennae. The control communication device provides for wireless communications in any now known or later developed format.

A control antenna may also be provided. The control antenna may be a plurality of control antennae. The control unit includes an antenna included with the circuitry of the PCB; however, additional antennae may also be included in the circuitry. The control antenna may be integrated with another component of the bicycle 50 or may be an independent component. For example, the control antenna may be integrated as part of the control communication device and/or as part of the brake lever 70.

Figure 5:
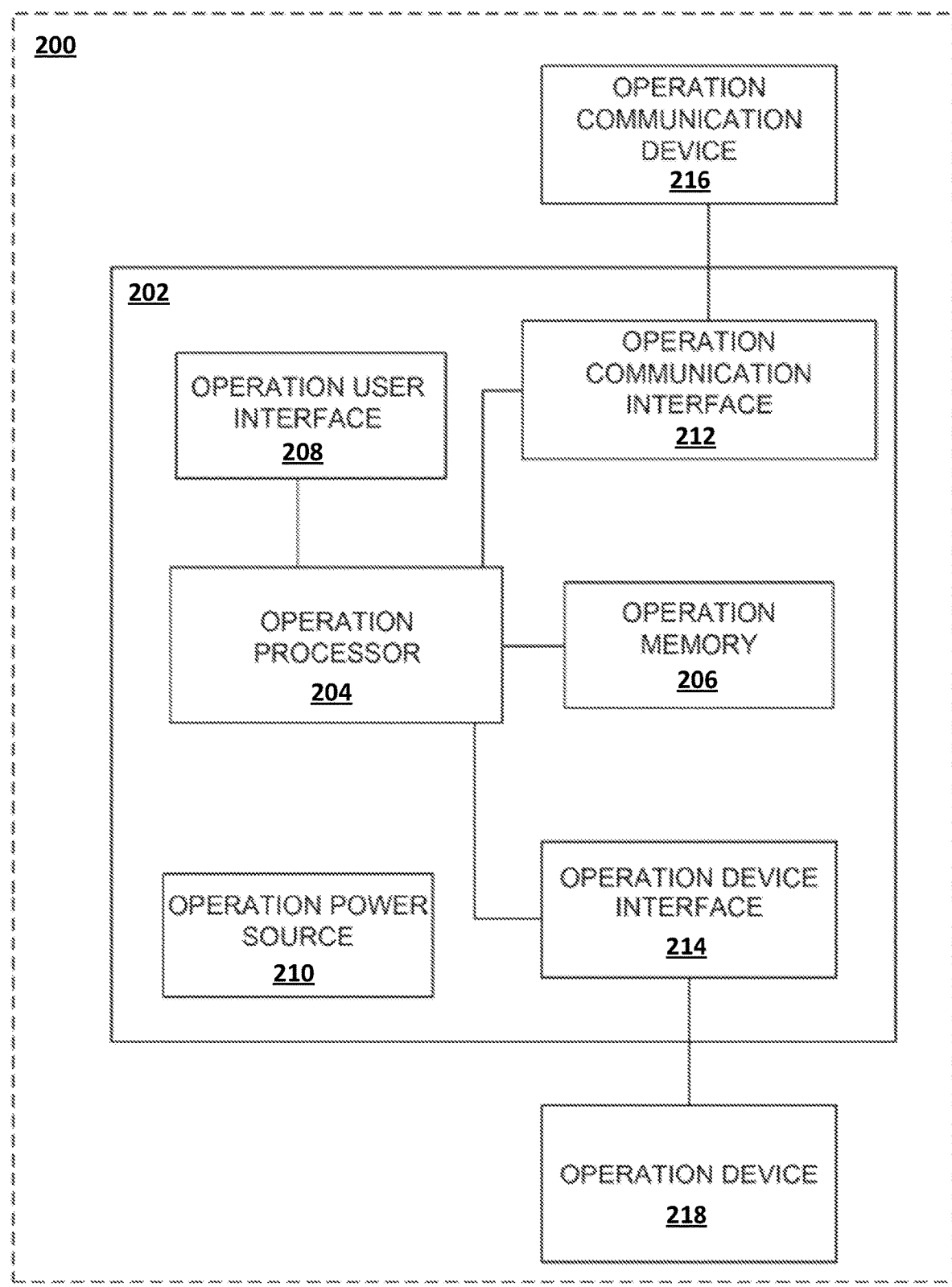
FIG. 5 is a block diagram of an embodiment of a gear changer.

FIG. 5 is a block diagram of an operation component 200. The operation component 200 may be one or more of the previously described components such as, for example, the rear derailleur 80 and the front gear changer 85. The operation component 200 may also be another component, such as an internal gearbox component, a suspension or an adjustable suspension component, or an adjustable seating component. A plurality of operation components 200 may be provided.

The operation component 200 is provided with an operation unit 202, which may be a circuit board or alternative configuration, as described above. The operation unit 202 includes an operation processor 204, an operation memory 206, an operation user interface 208, an operation power source 210, an operation communication interface 212, and an operation device interface 214. In an embodiment, the operation communication interface 212 is in communication with an operation communication device 216, and the operation device interface 214 is in communication with an operation device 218. Additional, different, or fewer components may be provided. For example, the operation user interface 208 may be omitted.

The structure, connections, and functions of the operation processor 204 may be representative of those of the rear processor, the front processor, or another component. The operation processor 204 may include a general processor, digital signal processor, an ASIC, FPGA, analog circuit, digital circuit, combinations thereof, or other now known or later developed processor. The operation processor 204 may be a single device or combinations of devices, such as through shared or parallel processing.

The operation memory 206 may be a volatile memory or a non-volatile memory. The operation memory 206 may include one or more of a ROM, a RAM, a flash memory, an EEPROM, or other type of memory. The operation memory 206 may be removable from the operation component 200, such as an SD memory card. In a particular non-limiting, exemplary embodiment, a computer-readable medium can include a solid-state memory such as a memory card or another package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device. Accordingly, the disclosure is considered to include any one or more of a computer-readable medium and other equivalents and successor media, in which data or instructions may be stored.

The operation memory 206 is a non-transitory computer-readable medium and is described to be a single medium. However, the term "computer-readable medium" includes a single medium or multiple media, such as a centralized or distributed memory structure, and/or associated caches that are operable to store one or more sets of instructions and other data. The term "computer-readable medium" shall also include any medium that is capable of storing, encoding, or carrying a set of instructions for execution by a processor or that cause a computer system to perform any one or more of the methods or operations disclosed herein.

The operation power source 210 is a portable power source, which may be stored internal to the operation component 200 or stored external to the operation component 200 and communicated to the operation component through a power conductive cable. The operation power source 210 may involve the generation of electric power, for example using a mechanical power generator, a fuel cell device, photo-voltaic cells, piezoelectric, or other power-generating devices. The operation power source 210 may include a battery such as a device consisting of two or more electrochemical cells that convert stored chemical energy into electrical energy. The operation power source 210 may include a combination of multiple batteries or other power providing devices. Specially fitted or configured battery types, or standard battery types may be used.

The operation device interface 214 provides for operation of a component of the bicycle 50. For example, the operation device interface 214 may transmit power from the operation power source 210 to generate movement in the operation device 218. In various embodiments, the operation device interface 214 sends power to control movement of at least one of the rear motor and the front motor. The operation device interface 214 includes wired conductive signals and/or data communication circuitry operable to control the operation device 218 (e.g., one or more switches and/or a pulse-width modulator).

The operation user interface 208 may be one or more buttons, keypad, keyboard, mouse, stylus pen, trackball, rocker switch, touch pad, voice recognition circuit, or other device or component for communicating data between a user and the operation component 200. The operation user interface 208 may be a touch screen, which may be capacitive or resistive. The operation user interface 208 may include an LCD panel, LED, LED screen, TFT screen, or another type of display. The operation user interface 208 may also include audio capabilities or speakers.

The operation communication interface 212 is configured to receive, with the operation communication device 216, data such as anticipation signals, operation signals, and/or other signals from bicycle components (e.g., the switch device 126). The operation communication interface 212 may also be configured to send data such as status signals (e.g., voltage sensor signals) for reception with the switch device 126. The operation communication interface 212 communicates the data using any operable connection. An operable connection may be one in which signals, physical communications, and/or logical communications may be sent and/or received. An operable connection may include a physical interface, an electrical interface, and/or a data interface. The operation communication interface 212 provides for wireless communications through the operation communication device 216 in any now known or later developed format. Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

Figure 6:
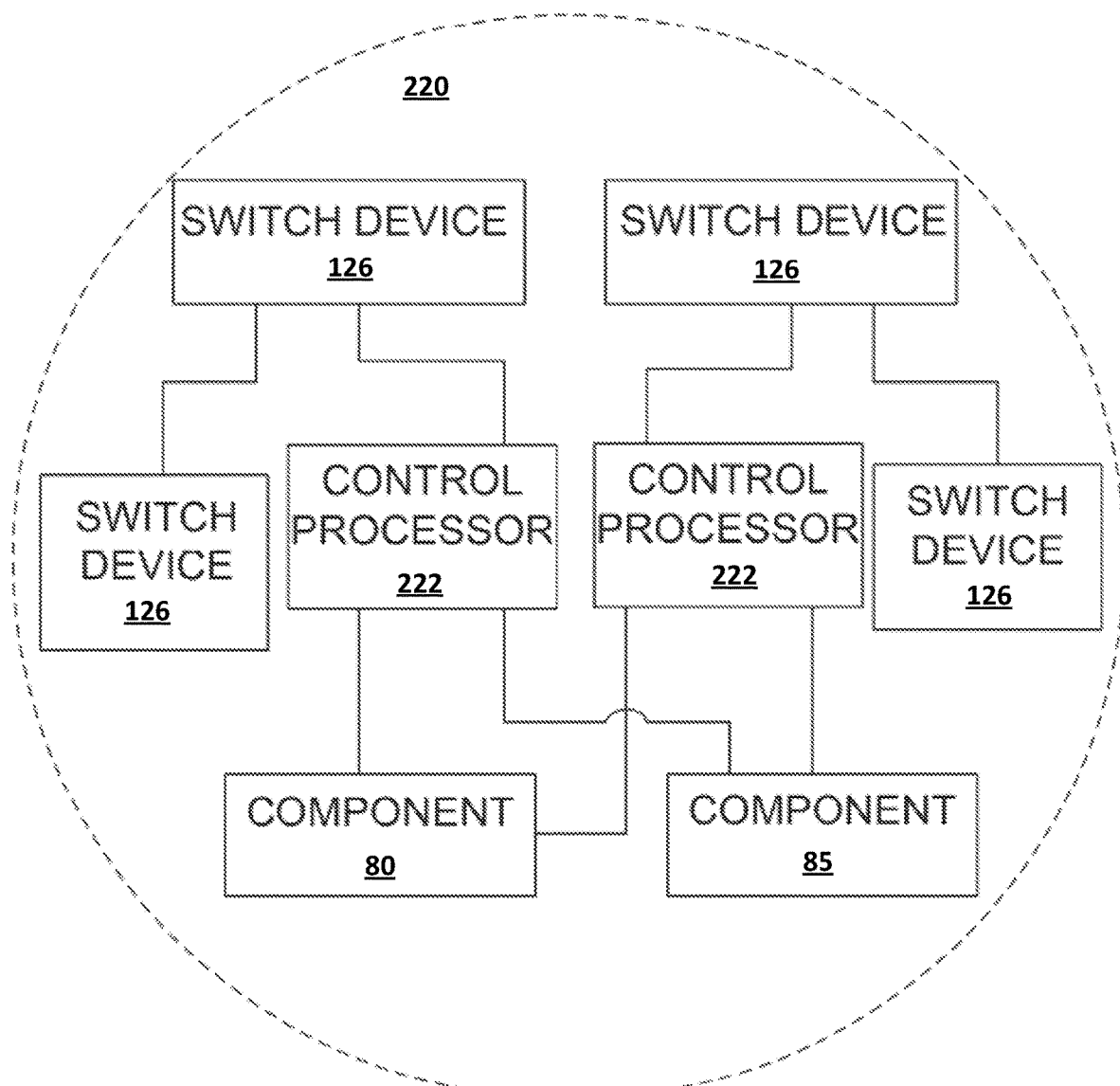
FIG. 6 is a block diagram of an embodiment of an electromechanical control system.

FIG. 6 is a block diagram of an embodiment of an electromechanical control system 220 for a bicycle 50. The electromechanical control system 220 may include one or more series configurations of the switch devices 126. A plurality of the switch devices 126 may connect to a single control processor in parallel or in series.

A control processor 222 communicates with at least one component. For example, the control processor 222 may communicate with the rear derailleur 80 and/or the front gear changer 85. Communication between the control processor 222 and components may be wired or wireless. A plurality of the control processors 222 may be associated with a plurality of components. For example, one or more components may be configured to listen for signals sent by a plurality of the control processors 222. In an embodiment, two of the control processors 222 each communicate with both the rear derailleur 80 and the front gear changer 85.

Figure 7:
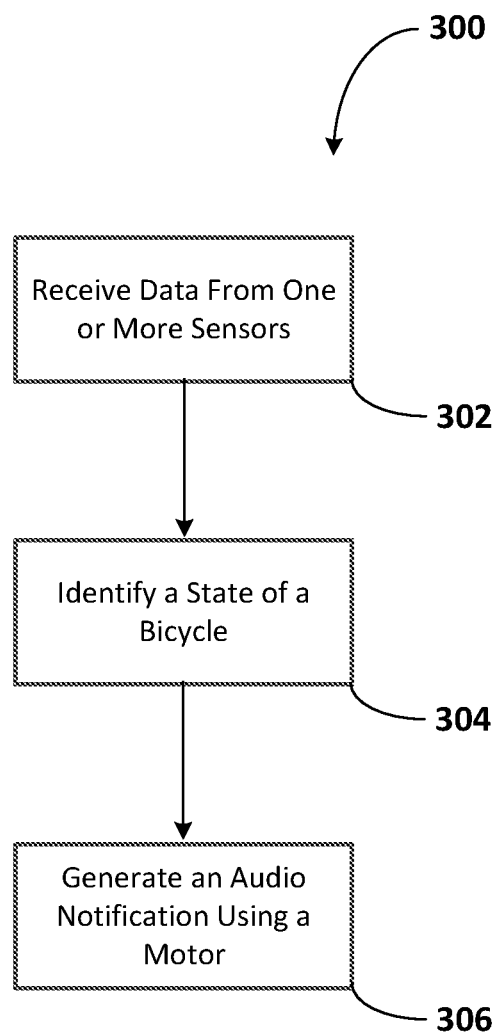
FIG. 7 is a flowchart of an embodiment of a method for controlling motion of a motor of a bicycle to generate an audio notification.

FIG. 7 is a flowchart of an embodiment of a method 300 for electromechanical control of a motor of a component (e.g., the rear derailleur 80) of a bicycle (e.g., the bicycle 50) to generate an acoustic notification. The flowchart also illustrates a method for transmitting and receiving wireless signals on the bicycle 50. As presented in the following sections, the acts may be performed using any combination of the components indicated in previous figures. For example, the following acts may be performed by the control assembly 120 and the operation component 200, as well as additional or other components. As another example, the following acts may be performed by only the operation component 200. In an embodiment, the acts may be performed by, for example, the control communication device of the switch device 126, the control processor 222, the operation communication device 216, the operation processor 204, the operation device 218, or any combination thereof. Additional, different, or fewer acts may be provided. The acts are performed in the order shown or in other orders. The acts may be repeated.

In act 302, a processor of the bicycle receives data from one or more sensors of the bicycle (e.g., a sensor). In one embodiment, the processor is a processor of a component of the bicycle. For example, the processor is a processor of a rear derailleur of the bicycle. In another embodiment, the processor is a processor of a controller (e.g., the control assembly 120) of the bicycle.

The one or more sensors may include any number of different types of sensors. For example, the one or more sensors include a motion sensor such as, for example, an accelerometer disposed on or in the component, or elsewhere on the bicycle. Other motion sensors may be provided (e.g., a velocity sensor). The motion sensor is configured to generate motion data (e.g., acceleration data) indicating motion of the bicycle, and the processor may receive the motion data directly from the motion sensor or via one or more components of the bicycle (e.g., the control assembly 120).

Additionally or alternatively, the one or more sensors may include a voltage sensor within a power source of the component or another component of the bicycle. The voltage sensor is configured to generate voltage data corresponding to a voltage of the power source, and the processor may receive the voltage data directly from the voltage sensor or via one or more components of the bicycle (e.g., the control assembly 120). In other embodiments, the one or more sensors include additional, fewer, and/or different sensors. For example, the one or more sensors may include a current sensor at the power source or another component of the bicycle.

The power source may be any number of different types of power sources for any number of components of the bicycle. For example, the power source may be a battery of the rear derailleur. In other embodiments, the power source is a battery of a suspension (e.g., the front suspension 102 and/or the rear suspension 104) or a battery of a seat post assembly (e.g., the seat post assembly 106).

In act 304, the processor identifies a state of the bicycle. For example, the processor identifies the state of the bicycle based on the sensor data received by the processor in act 302. In one embodiment, the processor identifies the state of the bicycle based on at least the voltage data received from the voltage sensor in act 302. For example, the state of the bicycle identified by the processor may be low voltage of the battery when the bicycle is moved from storage before a ride.

For example, the processor may put the component of the bicycle (e.g., the rear derailleur) into a lower power state based on motion data from the motion sensor identifying a predetermined period of inactivity (e.g., one hour, two hours, four hours, 24 hours). When the component is in the lower power state and the processor identifies motion of the bicycle based on motion data from the motion sensor, for example, the processor may transition the component back into an active state (e.g., turn radios on). Once the component is transitioned into the active state, the component (e.g., the processor of the component) may sample a voltage of the battery (e.g., in act 302).

The processor identifying the state of the bicycle in act 304 may include the processor comparing the voltage of the battery to a predetermined threshold voltage in such an embodiment. The predetermined threshold voltage may be a voltage of the battery below which the bicycle should not be ridden due to the possibility of the battery dying during a ride. When, based on the comparison, the voltage of the battery is less than the predetermined threshold voltage, the method 300 moves to act 306. When, based on the comparison, the voltage of the battery is greater than the predetermined threshold voltage (e.g., greater than or equal to the predetermined threshold voltage), the method 300 may end, as no state of the bicycle for which an audio notification is to be generated has been identified. In one embodiment, when, based on the comparison, the voltage of the battery is greater than the predetermined threshold voltage, the method 300 may still move to act 306 but generate a different audio notification compared to when the voltage of the battery is less than the predetermined threshold voltage.

The bicycle (e.g., the component) may include a memory, and the memory may be configured to store any number of parameters including, for example, predetermined period of inactivity and/or the predetermined threshold voltage. The memory may be configured to store more, fewer, and/or different parameters for control of electronic bicycle components of the bicycle.

In other embodiments, the processor identifies other states of the bicycle. For example, the identified state may be initiation, by the processor or another processor of the bicycle, of a pairing session on the bicycle. As another example, the identified state may be addition of the component or another electronic device of the bicycle to the pairing session. As yet another example, the identified state may be a Bluetooth connection, a Bluetooth disconnection, or interaction with a mobile phone application (e.g., via Bluetooth). As another example, the identified state may be completion of a firmware update. The processor may identify more, fewer, and/or different states of the bicycle. Data identifying states of the bicycle for which audio notifications are to be generated may be stored in the memory, and the processor may reference this data to determine whether the method 300 is to be executed for a particular state of the bicycle identified by the processor.

In act 306, the processor generates an audio notification in response to the state of the bicycle identified in act 304. In one embodiment, the generation of the audio notification includes control of current from the power source to a motor of the bicycle.

For example, the motor may be a motor of the rear derailleur of the bicycle. In other embodiments, the motor is a different motor of the bicycle such as, for example, a motor of the suspension or the seat post assembly of the bicycle.

In one embodiment, in response to the identified state of the bicycle, the processor may control the current from the power source to the motor of the bicycle, such that a periodic current with a frequency between 20 Hz and 20 kHz is applied to the motor. This frequency may be in a range of human hearing, such that the rider may hear the motor being operated, and such operation may act as an audio notification.

Electronic circuitry (e.g., of the motor module 94) is disposed between and electrically connected to the power source (e.g., the battery 96 of the rear derailleur 80) and the motor (e.g., the rear motor of the motor module 94 of the rear derailleur 80). The processor is in communication with and configured to control (e.g., wired communication or wireless communication) one or more electronic components of the electronic circuitry. The electronic circuitry may include any number of electronic components including, for example, one or more transistors, MOSFETs, pulse-width modulators, diodes, resistors, capacitors, inductors, or any combination thereof. The electronic circuitry may include one or more integrated circuits and/or discrete components electrically connected to form one or more circuits. For example, the electronic circuitry may include one or more switches that are controllable by the processor.

Figure 8:
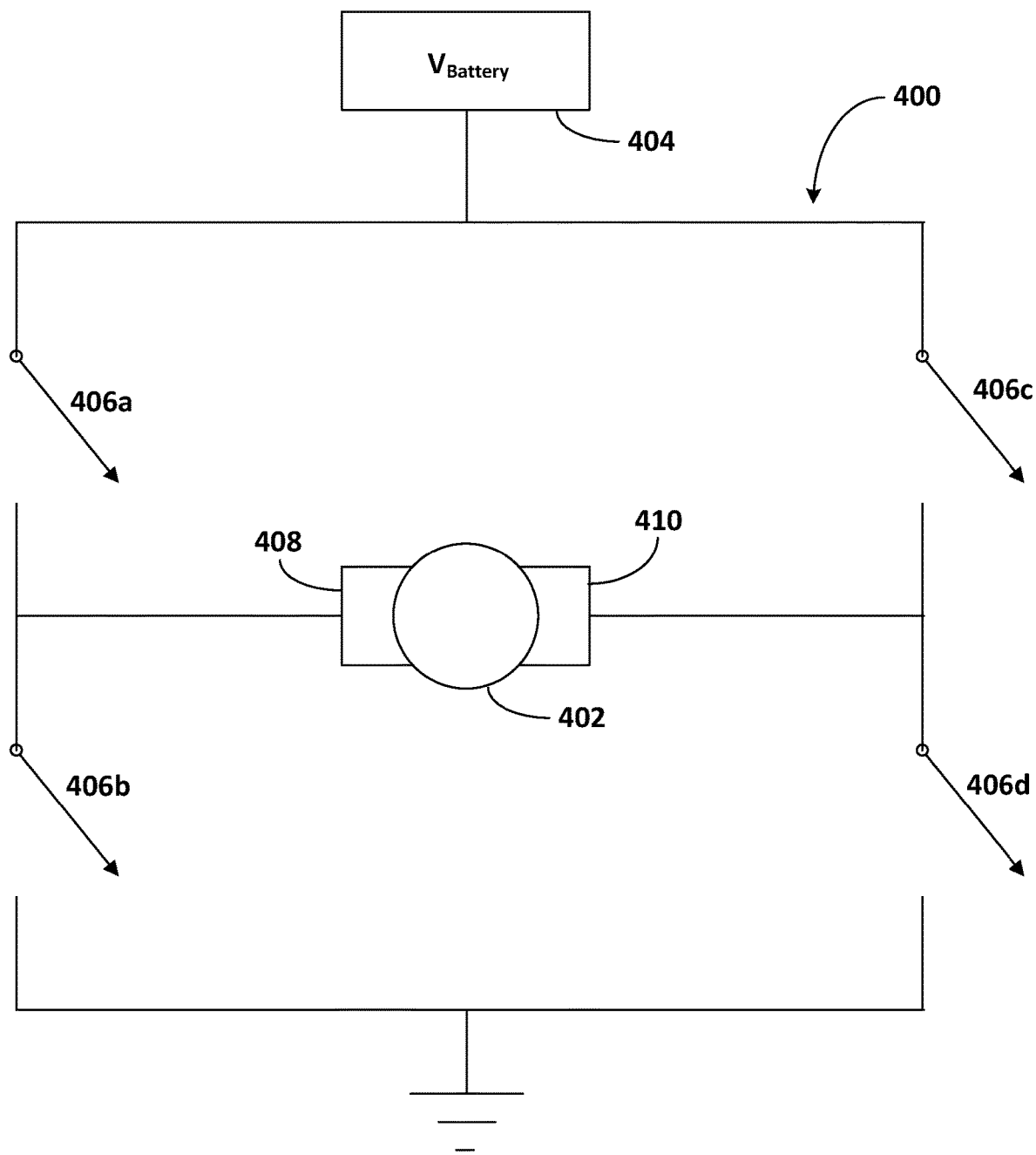
FIG. 8 is a circuit diagram of one embodiment of a circuit for controlling current applied to a motor of a bicycle for generation of an audio notification.

Referring to FIG. 8, in one embodiment, the electronic circuitry includes an H-bridge 400 configured to switch polarity of a voltage applied to a motor 402 (e.g., the rear motor of the motor module 94). The H-bridge 400 is disposed between and electrically connected a DC power source 404 (e.g., a battery such as the battery 96 of the rear derailleur 80) and the motor 402. The H-bridge 400 includes four switches 406 (e.g., solid-state switches such as MOSFETs). The processor controls switching of the four switches 406, such that the polarity of the voltage applied to the motor 402 is switched (e.g., at a frequency between, for example, 20 Hz and 20 kHz). For example, the processor controls switching of the H-bridge 400, such that switches 406a and 406d are closed and switches 406b and 406c are open for a first predetermined time period. A voltage of the battery 404 is thus applied to a first terminal 408 of the motor 402 for the first predetermined time period. After the first predetermined time period, the processor controls the switching of the H-bridge 400, such that switches 406a and 406d are open and switches 406b and 406c are closed for a second predetermined time period (e.g., same as the first predetermined time period). The voltage of the battery 404 is thus applied to a second terminal 410 of the motor 402 for the second predetermined time period. In one embodiment, this alternating between application of the voltage of the battery 404 to the first terminal 408 and the second terminal 410 of the motor is repeated any number of times (e.g., according to a length of the audio notification or a length of a tone or note of the audio notification to be generated).

Figure 9A:
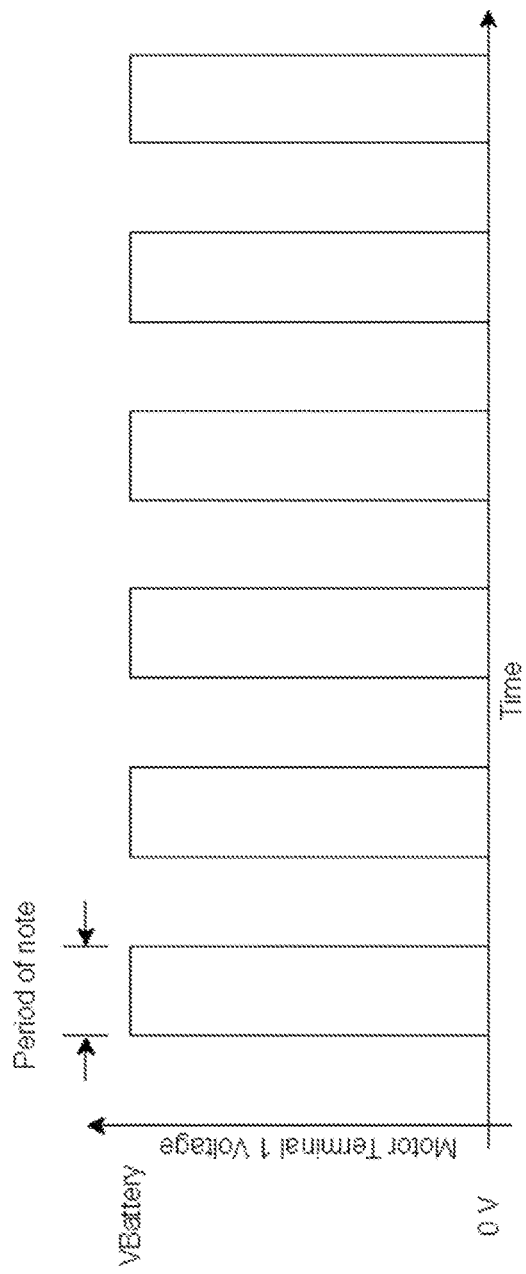
FIG. 9a is an exemplary graph of voltage versus time for a first motor terminal during the method of FIG. 7.
Figure 9B:
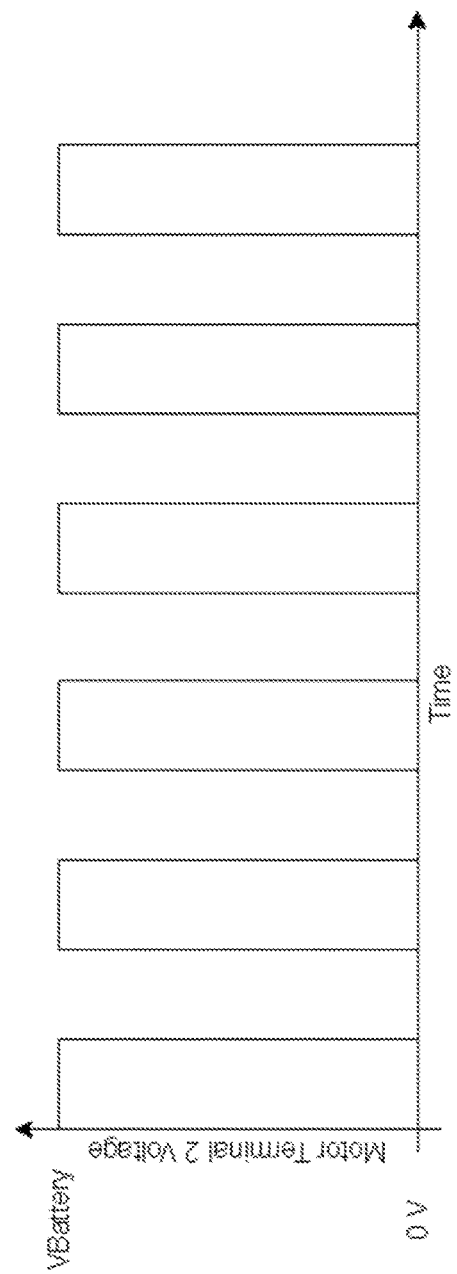
FIG. 9b is an exemplary graph of voltage versus time for a second motor terminal during the method of FIG. 7.

FIGS. 9a and 9b illustrate an example of the switching of the applied voltage (e.g., of the battery 404) between the first terminal 408 of the motor 402 and the second terminal 410 of the motor 402, respectively. Corresponding pulsed DC (PDC) currents (e.g., periodic currents such as square wave currents) are thus applied to the first terminal 408 of the motor 402 and the second terminal 410 of the motor 402, respectively. The PDC currents taken together act as an AC current with, for example, a frequency between 20 Hz and 20 kHz applied to the motor 402. The AC current applied to the motor 402 causes the motor 402 to change directions very rapidly, so that the motor 402 does not effectively advance a component of the bicycle (e.g., the rear derailleur) that is movable by the motor 402. In other embodiments, other periodic currents may be used to control the H-bridge 400.

The alternating between applying the voltage of the battery 404 to the first terminal 408 and the second terminal 410 of the motor 402 causes the motor 402 to rotate back and forth while also generating the audio notification (e.g., due to the frequency at which the motor 402 is operated). In other words, the motor 402 is configured to rotate in a first rotational direction and move the component in a first direction when the voltage of the battery 404 is applied to the first terminal 408 of the motor 402, and is configured to rotate in a second rotational direction (e.g., opposite the first rotational direction) and move the component in a second direction when the voltage of the battery 404 is applied to the second terminal 410 of the motor 402. The back and forth rotation of the motor 402 provides that the motor 402 may not actuate the component during the generation of the audio notification in act 306. Instead, the back and forth rotation of the motor 402 may rapidly move the component back and forth in the first direction and the second direction, respectively, such that the component is not actuated.

The method 300 may be repeated or run in parallel any number of times for different identified states of the bicycle. Different audio notifications with different tones, for example, may be generated by the processor for the different identified states of the bicycle, respectively. The different audio notifications may be generated by the processor with different periodic currents with different frequencies (e.g., each between 20 Hz and 20 kHz), respectively. For example, the periodic current discussed above with respect to act 306 may be a first periodic current for a first audio notification, and the identified state of the bicycle discussed above with respect to act 304 may be a first state of the bicycle. The first state of the bicycle is, for example, the initiation of a pairing session.

The method 300 may be repeated and may identify a second state of the bicycle. The second state of the bicycle may, for example, be the addition of the component or another electronic device of the bicycle to the pairing session (e.g., the initiation of which was identified as the first state of the bicycle). The processor may generate a second audio notification based on the identified second state of the bicycle. The generation of the second audio notification may include control of the current from the battery to the motor, such that a second periodic current is applied to the motor. The second periodic current is different than the first periodic current with respect to frequency, but both the first periodic current and the second periodic current have a frequency between 20 Hz and 20 kHz. This may be repeated for each electronic component of the bicycle added to the pairing session (e.g., with each audio notification corresponding to the addition of an electronic component to the pairing session being generated with a periodic current of a same frequency). In one embodiment, the processor may also identify an end of the pairing session as a state of the bicycle, and generate an audio notification (e.g., a third audio notification) based on the identified end of the pairing session.

The method 300 may be repeated on the same component (e.g., the rear derailleur acting as a pairing coordinator) or on, for example, different motorized components of the bicycle. For example, when the rear derailleur initiates a pairing session, the processor may generate the first audio notification using the motor of the rear derailleur. When, for example, another motorized component of the bicycle (e.g., a front derailleur) joins the pairing session, the processor or another processor (e.g., a processor of the front derailleur) generates the second audio notification using a motor of the front derailleur, for example. Alternatively, the processor may generate both the first audio notification and the second audio notification using the motor of the rear derailleur.

The method 300 may include additional, fewer, and/or different acts. For example, as an additional act, the processor may set a flag in the memory after the generation of the audio notification in act 306. The flag set in the memory may prevent, for example, repetition of the generation of the audio notification (e.g., for a particular identified state of the bicycle). In other words, the method 300 may not be repeated (e.g., for the particular identified state of the bicycle) until the flag set in the memory is cleared.

For example, the component (e.g., the processor of the component) may continue to sample the voltage of the battery and compare the voltage of the battery to the predetermined threshold voltage. Once, based on the comparison, the voltage of the battery is greater than the predetermined threshold voltage, the processor may clear the flag set in the memory, and the method 300 may be repeated. The audio notification may thus be generated each time the voltage of the battery moves below the predetermined threshold voltage.

As another example of an additional act, when, based on the comparison, the voltage of the battery is greater than the predetermined threshold voltage, and the flag in the memory is cleared, the processor may generate another audio notification (e.g., in response to the flag being cleared). The generation of the other audio notification may include control of current from the power source to the motor of the bicycle, such that a periodic current that is different than the periodic current generated in act 306 (e.g., corresponding to the voltage of the battery being below the predetermined threshold voltage) is generated. The different periodic currents may, for example, have different frequencies (e.g., between 20 Hz and 20 kHz), such that the audio notification generated in act 306 and the other audio notification, corresponding to the voltage of the battery being above the predetermined threshold voltage, have different tones. The rider, for example, may be able to identify when the battery is dead or dying and when the battery is charged sufficiently for a ride based on the tones of the different audio notifications, respectively.

Generating audio notifications using a motor may operate the motor at a high current. A current draw from the battery powering the motor, for example, may trigger a battery management system (BMS) undervoltage lockout condition. In one embodiment, as the component continues to sample the voltage of the battery, the processor may compare the voltage of the battery to a predetermined BMS lockout voltage. When, based on the comparison, the voltage of the battery is less than the predetermined BMS lockout voltage (e.g., for a predetermined period of time close to triggering a lockout) while the audio notification is being generated in act 306, the processor may stop the generation of the audio notification. In other words, in such a scenario, the processor may open all switches of the electronic circuitry (e.g., the switches 406 of the H-bridge 400) between the battery (e.g., the battery 404) and the motor (e.g., the motor 402), such that the voltage of the battery is not applied to the motor. This may prevent battery lockout that may otherwise be caused by the generation of an audio notification.

The first predetermined time period and the second predetermined time period (e.g., times respective pairs of switches 406 of the H-bridge 400 are closed) may be the same throughout the generation of the audio notification in act 306. In other embodiments, the first predetermined time period and/or the second predetermined time period may vary during the generation of the audio notification in act 306 (see FIG. 10). In other words, the motor 402 may be energized with currents of different frequencies, such that the audio notification may include different tones.

Figure 10:
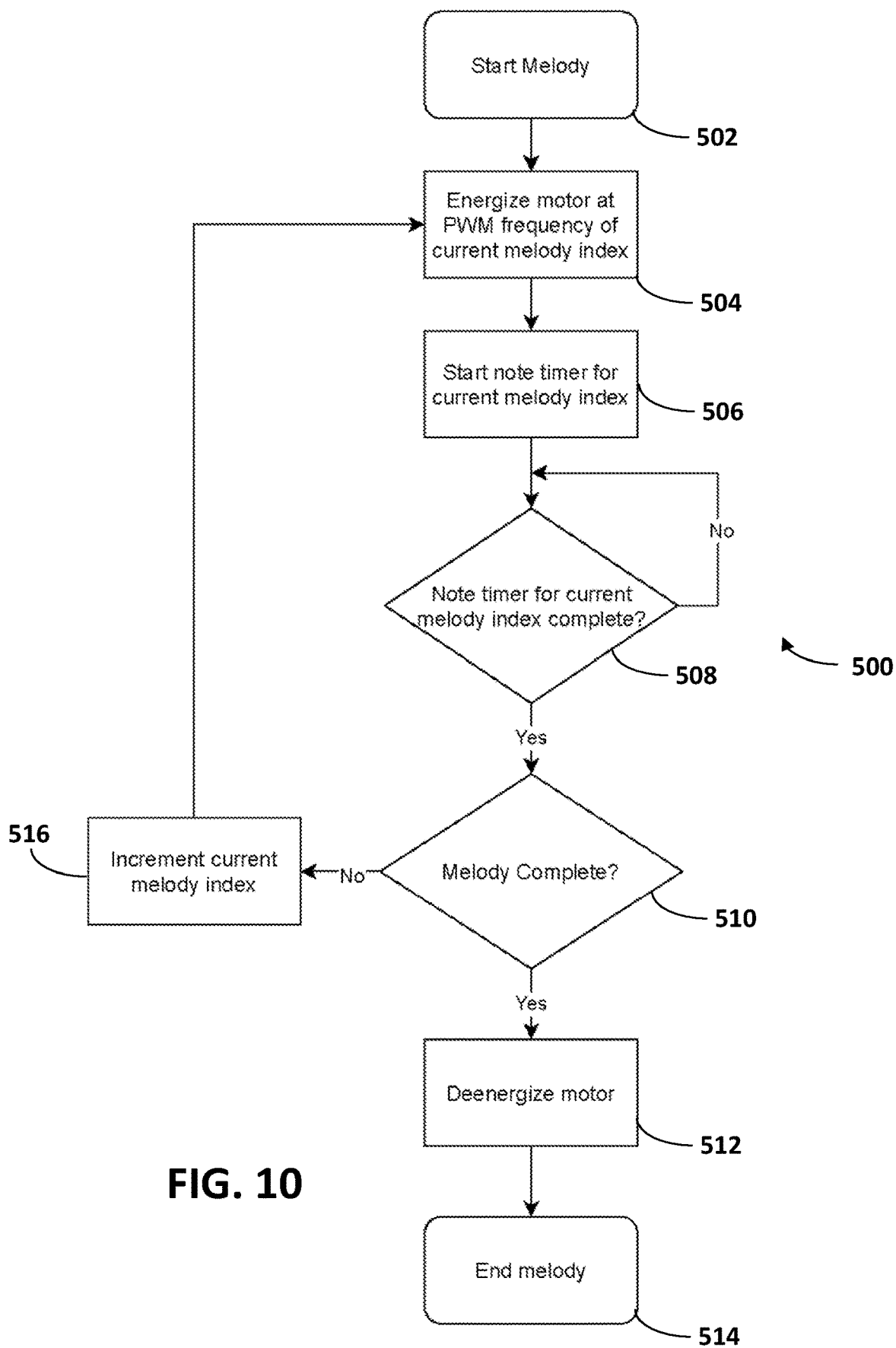
FIG. 10 a flowchart of another embodiment of a method for controlling motion of a motor of a bicycle to generate an audio notification.

FIG. 10 is a flowchart of another embodiment of a method 500 for electromechanical control of a motor of a component (e.g., the rear derailleur 80) of a bicycle (e.g., the bicycle 50) to generate an acoustic notification. For example, the method 500 may be executed to generate a melody with different tones in act 306 of the method 300 discussed above.

The flowchart also illustrates a method for transmitting and receiving wireless signals on the bicycle 50. As presented in the following sections, the acts may be performed using any combination of the components indicated in previous figures. For example, the following acts may be performed by the control assembly 120 and the operation component 200, as well as additional or other components. As another example, the following acts may be performed by only the operation component 200. In an embodiment, the acts may be performed by, for example, the control communication device of the switch device 126, the control processor 222, the operation communication device 216, the operation processor 204, the operation device 218, or any combination thereof. Additional, different, or fewer acts may be provided. The acts are performed in the order shown or in other orders. The acts may be repeated.

In act 502, the processor begins the method 500 (e.g., as part of the generation of the audio notification in act 306 of the method 300) to generate a melody (e.g., including a number of tones). In act 504, the processor energizes the motor at a frequency of a current melody index. In the act 504 executed directly after the melody is started in act 502, the current melody index may be "1". The motor energized at the frequency of the current melody index generates a particular note or tone.

In one embodiment, a pulse width modulator (PWM) controller is included within the electronic circuitry between the battery and the motor, and the PWM controller is configured to control a frequency of a periodic current applied to the motor. The PWM controller, for example, controls the frequency of the periodic current (e.g., generated with the H-bridge 400) to be the frequency at the current melody index.

The memory may be further configured to store data associated with notes, tones, and/or melodies corresponding to any number of identified states of the bicycle. For example, when the voltage of the battery is less than the predetermined threshold voltage, as discussed above, the processor may generate a particular audio notification (e.g., including notes in a minor key) according to the stored data. The memory may be configured to store the data associated with the notes, tones, and/or melodies and the corresponding states of the bicycle in, for example, a table.

Each note or tone may be defined by a frequency of a current to be applied to the motor, for example, and each melody may be defined by a series of notes or tones. Data stored in the memory for each note or tone may include, for example, data identifying the frequency of the current to be applied, a period of time the note or tone is to be generated, an index number if the note or tone is associated with a melody (e.g., a melody index), and/or other information. The processor may access the data stored in the memory corresponding to an identified state of the bicycle, and control the electronic circuitry (e.g., the H-bridge 400 and/or the PWM controller) to generate notes or tones according to the stored data.

In act 506, the processor starts a note timer (e.g., within the processor) for the current melody index. In act 508, the processor determines whether the note timer for the current melody index is complete. For example, the processor compares a value of the note timer to a period of time for the note associated with the current melody index. When, based on the comparison, the value of the note timer is greater than or equal to the period of time for the note associated with the current melody index, the method 500 moves to act 510. When, based on the comparison, the value of the note timer is less than the period of time for the note associated with the current melody index, the act 508 is repeated. In one embodiment, the act 508 may be repeated at any number of time intervals (e.g., 10 or 20 microseconds) until the note timer reaches the period of time for the note associated with the current melody index.

In act 510, the processor determines whether the melody is complete. For example, based on the data stored in the memory for the melody to be played, the processor determines whether the melody includes any additional notes. When the processor determines the melody does not include any additional notes, the method 500 moves to act 512, in which the processor deenergizes the motor. For example, the processor opens switches (e.g., the switches 406 of the H-bridge 400) of the electronic circuitry between the battery and the motor, such that current does not flow between the battery and the motor. After the motor is deenergized in act 512, the method 500 ends in act 514.

If the processor determines the melody includes additional notes in act 510, the method 500 moves to act 516. In act 516, the processor increments the current melody index. The current melody index may be stored in the memory, and the processor may increment the current melody index within the memory. After the processor increments the current melody index in act 516, the method 500 returns to act 504, and at least acts 504-510 are repeated.

In one embodiment, a melody to be generated as, for example, an audio notification may include pauses or rests between notes. The method 500 may handle such pauses, in that when a rest is associated with the current melody index number, the motor is deenergized in act 504 instead of energized at a particular frequency. An example of a melody including such rests, as defined within the memory, for example, is provided below:

// Define the period of each note in microseconds
define B_FLAT 536
define A 568
define A_FLAT 601
define G 638
define REST 0
melody_notes=[B_FLAT, REST, A, REST, A_FLAT, REST, G]
melody_timing=[200, 100, 200, 100, 200, 100, 500]// milliseconds Frequencies for the notes B_FLAT, A, A_FLAT, G, and REST are respectively defined. An order in which the notes are to be generated is defined with the "melody_notes", and the periods of time for the respective notes are defined with the "melody_timing". The memory may also store an associated melody index for each of the "melody_notes". Alternatively, the incrementing of the current melody index may include the processor moving through the "melody_notes". Other notes may be defined, the "melody_notes" may include more, fewer, and/or different notes, and/or different "melody_timing" may be provided.

Melodies that use frequencies or musical notes in a minor key may imply a negative meaning and may be appropriate for warnings. Melodies that use musical notes in a major key may imply a positive meaning. If the bicycle is configured to also indicate a good battery state, for example, at the beginning of use, a melody that had a positive connotation (e.g., including notes in a major key) may be used.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A motorized component for a bicycle, the motorized component comprising:
   a motor;
   a power source configured to generate current for the motor; and
   a processor configured to:
      identify a state of the bicycle; and
      generate an audio notification in response to the identified state of the bicycle, the generation of the audio notification comprising control of the current from the power source to the motor, such that a periodic current with a frequency between 20 Hz and 20 kHz is applied to the motor.

2. The motorized component of claim 1, wherein the power source is a battery configured to generate DC current.

3. The motorized component of claim 2, further comprising electronic circuitry electrically connected to the power source and the motor, between the power source and the motor,
   wherein the processor is in communication with the electronic circuitry and is further configured to control the electronic circuitry, such that the generated DC current is converted to the periodic current with the frequency between 20 Hz and 20 KHz.

4. The motorized component of claim 3, wherein the electronic circuitry includes a switch, and
   wherein the processor is further configured to control the switch, such that the generated DC current is converted to pulsed DC (PDC) current, the PDC current being the periodic current.

5. The motorized component of claim 3, wherein the battery has a battery voltage, the battery voltage being applied to the motor via the electronic circuitry,
   wherein the motor has a first terminal and a second terminal, and
   wherein the processor is further configured to control the electronic circuitry, such that the application of the voltage of the battery is switched between the first terminal and the second terminal of the battery and the periodic current is AC current with the frequency between 20 Hz and 20 kHz.

6. The motorized component of claim 5, wherein the electronic circuitry includes an H-bridge, and
   wherein the processor is further configured to control the H-bridge, such that the application of the voltage of the battery is switched between the first terminal and the second terminal of the battery.

7. The motorized component of claim 5, wherein the motor is configured to:
   rotate in a first rotational direction and move a movable part of the bicycle in a first direction when the voltage of the battery is applied to the first terminal of the motor; and
   rotate in a second rotational direction and move the movable part of the bicycle in a second direction when the voltage of the battery is applied to the second terminal of the motor, the second rotational direction being opposite the first rotational direction.

8. The motorized component of claim 1, wherein the processor is further configured to:
   receive data from a sensor of the bicycle; and
   identify the state of the bicycle based on the received data.

9. The motorized component of claim 8, wherein the sensor is a motion sensor, and the data is motion data indicating motion of the bicycle,
   wherein the identification of the state of the bicycle comprises identification of a voltage of the power source or another power source of the bicycle,
   wherein the processor is further configured to compare the identified voltage to a predetermined threshold voltage, and
   wherein the generation of the audio notification in response to the identified state of the bicycle comprises generation of the audio notification when, based on the comparison, the identified voltage is less than the predetermined threshold voltage.

10. The motorized component of claim 9, further comprising a memory,
    wherein the processor is further configured to set a flag in the memory after the generation of the audio notification, the flag preventing repetition of the generation of the audio notification.

11. The motorized component of claim 10, wherein the voltage is a first voltage, and
    wherein the processor is further configured to:
       identify a second voltage of the power source or the other power source of the bicycle, the second voltage being identified after the first voltage is identified;
       compare the identified second voltage to the predetermined threshold voltage; and
       clear the flag set in the memory when, based on the comparison of the identified second voltage to the predetermined threshold voltage, the identified second voltage is greater than the predetermined threshold voltage.

12. The motorized component of claim 9, wherein the audio notification is a first audio notification, the periodic current is a first periodic current, and the frequency is a first frequency,
    wherein the processor is further configured to:
       based on the comparison, when the identified voltage is greater than the predetermined threshold voltage, generate a second audio notification, the generation of the second audio notification comprising control of the current from the power source to the motor, such that a second periodic current with a second frequency is applied to the motor, the second frequency being between 20 Hz and 20 kHz and being different than the first frequency.

13. The motorized component of claim 1, wherein the periodic current is a first periodic current, and the frequency is a first frequency,
    wherein the generation of the audio notification comprises control of the current from the power source to the motor, such that a second periodic current is applied to the motor after the first periodic current is applied to the motor, the second periodic current having a second frequency, the second frequency being between 20 Hz and 20 kHz and being different than the first frequency.

14. The motorized component of claim 13, further comprises a memory configured to store data representing the first frequency, a first duration, the second frequency, and a second duration, the first duration being a duration of the first periodic current and the second duration being a duration of the second periodic current, wherein the processor is further configured to identify, based on the identified state of the bicycle, the stored data representing the first frequency, the first duration, the second frequency, and the second duration, and wherein the generation of the audio notification comprises control of the current from the power source to the motor, such that the second periodic current is applied to the motor for the second duration after the first periodic current is applied to the motor for the first duration.

15. The motorized component of claim 1, wherein the periodic current is a first periodic current, the audio notification is a first audio notification, and the state of the bicycle is a first state of the bicycle, the identified first state of the bicycle being initiation of a pairing session on the bicycle, wherein the processor is further configured to:

identify a second state of the bicycle, the second state of the bicycle being addition of the motorized component or another electronic device of the bicycle to the pairing session; and based on the identified second state of the bicycle, generate a second audio notification, the generation of the second audio notification comprising control of the current from the power source to the motor, such that a second periodic current is applied to the motor, the second periodic current being different than the first periodic current and having a frequency between 20 Hz and 20 KHz.

16. The motorized component of claim 1, wherein the identified state of the bicycle includes Bluetooth connection, Bluetooth disconnection, or completion of a firmware update.

17. The motorized component of claim 1, wherein the power source is a battery having a battery voltage, wherein the processor is further configured to:

monitor the battery voltage;

compare the monitored battery voltage to a predetermined threshold battery voltage; and stop the generation of the audio notification when, based on the comparison, the monitored battery voltage is less than the predetermined threshold battery voltage while the audio notification is being generated.

18. A rear derailleur for a bicycle, the rear derailleur comprising:

a motor configured to move a movable part of the rear derailleur;

a battery configured to generate current for the motor;

a sensor configured to measure a voltage of the battery; and a processor in communication with the sensor, the processor being configured to:

compare the measured voltage to a predetermined threshold voltage; and based on the comparison, generate an audio notification using the motor when the measured voltage is less than the predetermined threshold voltage.

19. The rear derailleur of claim 18, wherein the generation of the audio notification comprises control of the current from the battery to the motor, such that a periodic current with a frequency between 20 Hz and 20 kHz is applied to the motor and a rotational direction of the motor switches between a first rotational direction and a second rotation direction, the second rotational direction being opposite the first rotational direction.

20. A method for generating an audio notification using a motor of a bicycle, the bicycle comprising a power source configured to generate current for the motor, the method comprising:

identifying, by a processor, a state of the bicycle; and generating, by the motor, the audio notification based on the identified state of the bicycle, generating the audio notification comprising:

controlling, by the processor, the current from the power source to the motor, such that a periodic current with a frequency between 20 Hz and 20 KHz is applied to the motor.

* * * * *